July 12, 1960 G. MASON 2,944,821
PLASTIC ARTICLES OF CONTROLLED SPECIFIC GRAVITY
HAVING A WEAR-RESISTANT OUTER SURFACE
AND METHOD OF PREPARING THE SAME
Filed Nov. 20, 1957
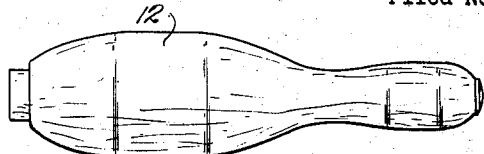
Fig. 1.
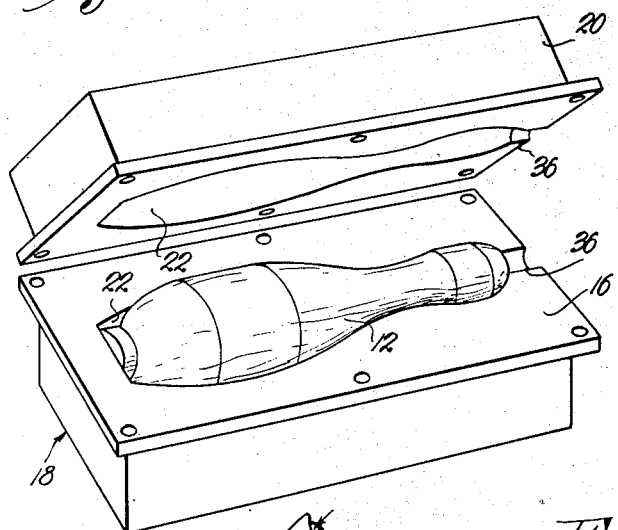
Fig. 2.
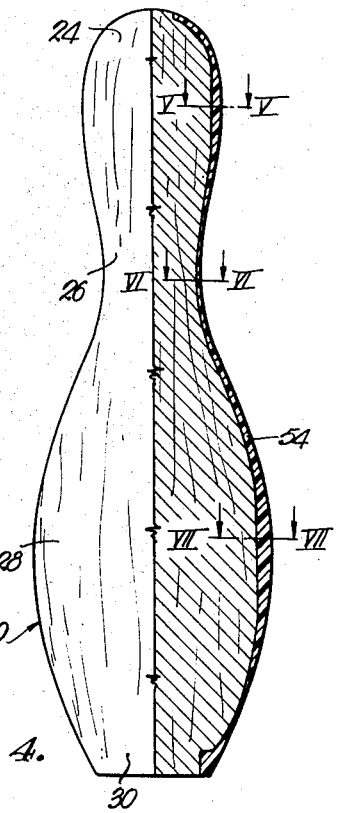
Fig. 4.
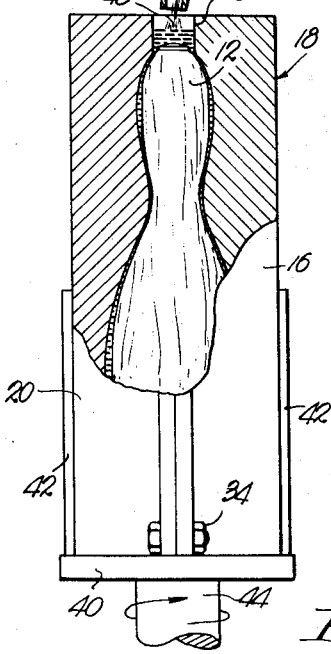
Fig. 3.
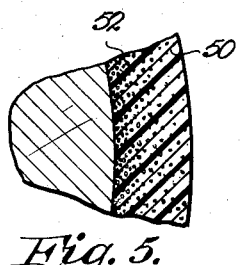
Fig. 5.
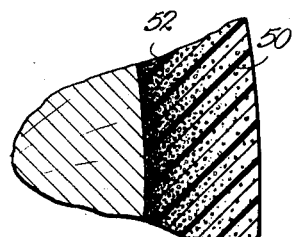
Fig. 7.
Fig. 6.
INVENTOR.
George Mason
BY
ATTORNEY.

United States Patent Office 2,944,821
Patented July 12, 1960

2,944,821

PLASTIC ARTICLES OF CONTROLLED SPECIFIC GRAVITY HAVING A WEAR-RESISTANT OUTER SURFACE AND METHOD OF PREPARING THE SAME

George Mason, Kansas City, Mo., assignor to Modern Plastics Research and Sales, Inc., Kansas City, Kans., a corporation of Kansas Filed Nov. 20, 1957, Ser. No. 697,656

14 Claims. (Cl. 273—82)

This invention relates to an article of manufacture having a wear-resistant outer surface, as well as to a method of producing such an article wherein the specific gravity of the latter may be accurately controlled without interfering with the wear-resistance of the outer surface thereof.

The primary object of this invention is to provide a method of producing a molded article of manufacture wherein the specific gravity of the substance adapted to be molded may be controlled by incorporating substantially lighter material into the same prior to molding and wherein centrifugation is utilized during the molding process to partially segregate the lighter material from the substance and prevent the lighter material from remaining at the outermost surface of the molded article and thereby reduce the wear-resistant characteristics of such outer surface.

A further important object of the invention relates to the provision of a method of producing an article as set forth above wherein a fluid substance capable of undergoing physical transformation to a solid state is utilized, and which is combined with a particulate material having a lower specific gravity than the substance to the end that the admixture may be subsequently introduced into a mold and rotated at a predetermined rate for a definite time to thereby effect proportional segregation of the substance and the material depending upon the relative velocities of various areas of the admixture within the mold whereby the heavier fluid material accumulates adjacent the outer portions of the admixture within the mold to thereby form a wear-resistant outer surface upon transformation of the fluid substance to a solid state.

Another important object of the invention is to provide a method as set forth above wherein the substance capable of undergoing transformation to a solid state is a polymerizable synthetic resin which is mixed with a curing agent so that the material will polymerize and set up in the mold, thereby eliminating the necessity of heat treating operations and the like. Also an object of the invention is to utilize particulate material in the polymerizable substance in a nature of a mass of discrete, hollow spherical particles provided with individually separate, continuous, hole-free, self-supporting walls so that the specific gravity of the polymerizable substance may be accurately controlled by the proportion of hollow particles which are incorporated into the resin substance.

Another important object of the invention is to provide a method of producing an elongated, longitudinally, irregularly-shaped article wherein the article includes a solid substance having a dispersion of hollow particles therein and which includes the step of rotating the materials during formation of the article so that the greatest proportion of the polymerizable substance is disposed at the areas of the article which are rotated at the highest velocity to thereby impart the greatest wear-resistance to those portions of the article spaced the greatest distance from the longitudinal axis of the same.

Also another important object of the invention relates to the provision of a method of producing a coated bowling pin wherein the coating is sufficiently tough and impact-resistant to resist long and hard usage and which has a low enough specific gravity to keep the over-all weight of the pin within the limits established by the authority controlling production of all bowling pins.

Other important objects of the invention include the provision of a method of producing a plastic coated bowling pin wherein a wooden core is placed within a suitable mold, and the polymerizable material containing the particulate material introduced into the mold in surrounding relationship to the core so that upon rotation of the mold proportional segregation of the polymerizable substance and the particulate material is effected to thereby form a high impact resistant surface on the outermost face of the bowling pin; the provision of a method of producing a bowling pin of controlled weight having a wooden core and a relatively heavy outer coating of plastic material which meets the size specifications defined by the American Bowling Congress but weighs the same or even less than a comparable sized, all wood pin; the provision of an article made in accordance with the principles of the method above set forth; and the provision of other important objects and details of construction which will become obvious as the following specification progresses when taken in conjunction with the drawings, wherein:

Fig. 1 is a longitudinal, side elevational view of a wooden core forming a part of a bowling pin made in accordance with the principles of this invention.

Fig. 2 is an exploded perspective view of a mold utilized in forming a bowling pin and illustrating the wooden core disposed in one part of the mold.

Fig. 3 is a fragmentary, vertical, end elevational view of the mold illustrated in Fig. 2 and showing the same in a closed, pin-forming condition, the mold being broken away and in section to reveal details of construction, as well as the manner in which fluid substance is introduced into the mold.

Fig. 4 is a side elevational view of a bowling pin constructed according to the present invention, one-half of the pin being broken away and in section to show details thereof; and Figs. 5, 6 and 7 are greatly enlarged, horizontal, cross-sectional views substantially taken on lines V—V, VI—VI and VII—VII respectively of Fig. 4.

Briefly, the present invention relates to a method of producing plastic articles, and especially those in the nature of bowling pins, by admixing a fluid substance capable of undergoing transformation or polymerization to a solid state with a particulate material in the nature of hollow spheres having a substantially lower specific gravity than the polymerizable material and introducing the admixture into a suitable mold for rotation thereof.

It is contemplated that a catalyst or curing agent be added to the polymerizable material so that the material will undergo polymerization to a solid state within a prescribed period of time. Before polymerization of the substance takes place the mold containing the admixture is rotated for a predetermined period of time and at a predetermined rate to effect proportional segregation of the particulate material and the polymerizable substance depending upon the relative velocities of various areas of the admixture disposed within the mold. It can be appreciated that the degrees of segregation will depend upon the rate at which the mold is rotated and the time of such rotation, thus causing a certain proportion of the polymerizable substance to accumulate adjacent the outer face of the article formed within the mold while the greatest proportion of particulate material will be found in closer proximity to the longitudinal axis of the article. After a predetermined degree of segregation of the substance and the particulate material has been effected, rotation of the mold is stopped and the admixture allowed to remain within the mold until polymerization of the substance has taken place. Thereupon, the article produced is removed from the mold and is ready for other operations including a heat curing, if the same is necessary.

Manifestly, because of the accumulation of polymerizable material adjacent the outermost face of the article, upon hardening, the substance forms a wear-resistant surface and the particulate material does not in any manner interfere with the impact and shock-resistant characteristics of the outer surface of the article.

More specifically, the present invention relates to a method of producing an article of manufacture such as

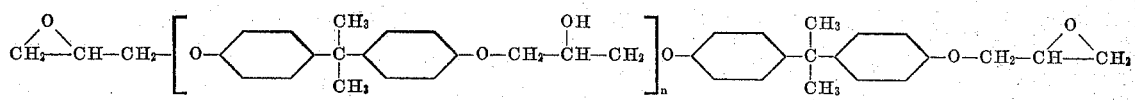

a bowling pin broadly designated by the numeral 10 and which includes an inner wooden core 12 substantially surrounded by a plastic coating.

In order to make the method of the present invention more understandable, certain of the steps of production thereof are illustrated in the drawing wherein it can be seen that wooden core 12 is initially placed within one half 16 of a pin mold 18. Another mold half 20 is provided and each of the halves 16 and 20 is provided with identical, irregularly-shaped depressions or cavities 22 configured so as to present a bowling pin 10 substantially as illustrated in Fig. 4. As shown in Fig. 2, core 12 is initially placed in one of the mold halves 16 or 20, whereupon the other mold half is then placed in position thereon as shown in Fig. 3.

Pin 10 includes four distinct regions which will be designated for convenience herein as head 24, neck 26, main body 28, and end 30, and as clearly apparent in Fig. 1, wooden core 12 is shaped in a substantially similar manner except for body 28 which has been suitably turned down so as to present a substantially cylindrical area 32 at the belt or main body portion thereof. As clearly seen in Fig. 3, the external dimensions of wooden core 12 are somewhat less than the internal dimensions of cavities 22 so that a space is presented between core 12 and the adjacent portions of mold halves 16 and 20 forming cavities 22.

Securing means in the nature of bolt and nut fasteners 34 are provided for holding mold halves 16 and 20 in pin-forming relationship and each of the mold halves 16 and 20 is provided with a semi-cylindrical groove 36 at corresponding ends thereof which cooperate to present an opening 38 communicating with cavities 22.

After core 12 has been placed within mold halves 16 and 20 and the halves have been secured in pin-forming relationship, mold 18 is subsequently placed in position on a centrifuge table 40 with the longitudinal axis of the cavities 22 disposed in an upright position. Bracing plates such as 42 may be provided on centrifuge table 40 for maintaining mold 18 in proper upright relationship, while an elongated shaft 44 of a suitable prime mover (not shown) is secured to the underside of centrifuge table 40.

A fluid admixture for forming a coating in surrounding relationship to wooden core 12 is introduced into opening 38 of mold 18 via a supply tube 46. The fluid admixture introduced into mold 18 preferably includes a fluid substance capable of undergoing physical transformation to a solid state and a particulate material having a lower specific gravity than the transformable substance.

Although many chemical compositions could be utilized because of their property of undergoing transformation from a fluid to a solid state, it is especially contemplated that a liquid synthetic resin substance be employed which has the characteristic of undergoing polymerization to a solid state either under the action of a catalyst or curing agent, or by heat treatment. Any polymerizable material capable of undergoing polymerization to a solid state is utilizable of course, but it has been found that epoxy-type synthetic resins are the preferred transformable compositions.

Epoxy resins are poly ethers having alternating aromatic and aliphatic centers. They are usually prepared by the reaction of a dihydric phenol with epichlorohydrin, the most common epoxy being formed by reacting Bisphenol A. Most commercial epoxy resins are formulated to contain an excess of epichlorohydrin so that the polymers formed will have terminal epoxide groups and thus correspond to the following basic structure:

Among the epoxy resins which have been found to be operable in the present invention are those manufactured by the Jones-Dabney Co., Newark, New Jersey, a division of Devoe & Raynolds Company, Inc. which are sold under the trade names of Epi-Rez 507 and Epi-Rez 510 or mixtures thereof. The physical constants of Epi-Rez 507 and Epi-Rez 510 are as follows:

*Epi-Rez 507*

Viscosity _____ 450–650 cps.
Wt./epoxide _____ 375–410.
Color _____ 2 maximum.
Specific gravity _____ 1.13–1.15.
Percent hydrolyzable Cl _____ 0.15 maximum.

*Epi-Rez 510*

Viscosity _____ 10,000–16,000.
Sp. gr. _____ 1.15–1.17 @ 25° C.
Color _____ 3 (max.).
Wt./epoxide _____ 180–200.
Hydrolyzable chlorine _____ .1% max.

Other epoxies which have been tested and found satisfactory include those marketed by Shell Chemical Corporation, New York, New York, and which are sold under the trademark Epon. The Epons having particular utility are those designated Epon 828, Epon 820 and Epon 815. All of these Epons are liquids and Epon 815 has a Gardner color of 8 max., a viscosity in Gardner-Holdt poises of 5–9 at 25° C., and an epoxide equivalent of 175–210.

Epon 820 has a Gardner color of 8 max., a viscosity of 40–100 Gardner-Holdt poises at 25° C., and an epoxide equivalent of 175 to 210, while Epon 828 has a Gardner color 8 max., at 25° C., a viscosity of 100 to 160 Gardner-Holdt poises at 25° C. and an epoxide equivalent of 175 to 210. The epoxide equivalent designated above refers to grams of resin containing one gram equivalent of epoxide.

Most of the epoxy resins referred to polymerize to a relatively tough, somewhat brittle solid and, therefore, it is preferred to incorporate a polymerizable fluid plasticizer resin or rubber into the epoxy to thereby impart some flexibility to the epoxy resin while impact and shock-resistant characteristics are retained. In this respect it has been found that polysulfide rubbers will suitably plasticize the epoxy resin while not interfering in any manner with the physical characteristics of the epoxy resin because of the fact that the polysulfide rubber product will polymerize with the epoxy to form a cross-linked structure. The preferred plasticizer is a product manufactured and sold by Thiokol Chemical Corporation, Trenton, New Jersey, and which is designated "LP-8."

Thiokol describes LP-8 as a liquid polythiodithiol polymer prepared by reacting bis (2-chloroethyl) formal with trichloropropane. The structure of LP-8 may be represented as follows:

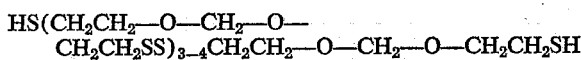

HS(CH₂CH₂—O—CH₂—O—
CH₂CH₂SS)₃₋₄CH₂CH₂—O—CH₂—O—CH₂CH₂SH

Other substances in the nature of polymerizable plasticizers may be utilized and, in this connection, it has been found that polyamide resin #100 produced and sold by General Mills, Inc. of Kankakee, Illinois, has been successfully utilized, as well as Thiokol's ZL-207, and a product sold under the trademark Cardolite NC 513 produced and sold by the Irvington Chemical Division of Minnesota Mining & Manufacturing Company, located at Newark, New Jersey.

In order to facilitate production of pins 10 on assembly line operations to be hereinafter described, it is preferred that the polymerizable material such as the epoxy resins and polysulfide rubbers, undergo polymerization through utilization of a catalyst or curing agent rather than by virtue of heat cure methods or the like. Many curing agents for epoxy resins have been found to be successful and which will operate to cause copolymerization of the epoxy resin and the polysulfide rubber. Curing agents for epoxy resins can be divided into two types, the first type including di and poly functional materials having more than one atom or position per molecule capable of being reacted with either or both the epoxy and hydroxy groups on the resin while the second type of curing agents become an integral part of the cured material. The second type of curing agents described above are more nearly catalytic in nature and tend to initiate and promote self-condensation and polymerization of the resin by promoting reaction of epoxy groups and hydroxy groups already on the resin.

Amines, poly amines, organic acids, anhydrides and poly anhydrides have all been found to be successful in curing or catalyzing the polymerization of epoxy-type resins. Specific examples of the operable curing agents include the following: ethylene diamine, diethylene triamine, triethylene tetramine, tetraethylene pentamine, 3,3' iminobispropylamine, amino ethyl ethanol amine, Duomeen S, p-p' methylene dianiline, m-phenylene diamine, di (1 amino cyclohexyl methyl) amine, diamino diphenylsulfone, triethylamine, benzyl dimethylamine, dimethyl amino methyl phenol (DMP-10), tri (dimethyl amino methyl) phenol (DMP-30), piperidine, n,n dimethyl amino propyl amine, n,n diethyl amino propyl amine, n,n dibutyl amino propyl amine, dimethylamino-propylamine, diethylamine, dimethylamino-propionitrile pyridine.

An example of a polybasic anhydride which may be utilized as a converter for the epoxy resins is phthalic anhydride while polyfunctional phenols such as bisphenol are useful in some applications when used with an amine catalyst. Furthermore, many organic acids are useful in curing epoxy resins, but the acids and anhydrides are more properly termed cross-linking agents rather than catalysts for the curing of epoxy resins.

By utilization of the catalyst type of curing agent, cross-linking is effected between the polysulfide composition and the epoxy resin to produce a plasticized, tough, impact-resistant polymer which operates to increase the useful life of pin 10.

Many methods have heretofore been proposed to provide a plastic coating upon bowling pins and to additionally provide pins completely constructed of plastic substances, but these methods have met with difficulty because of the weight requirements specified by the governing authority prescribing the specifications which all bowling pins must meet, and such methods have, for the most part, been unsuccessful because it was impossible to produce a pin meeting the weight requirements which had a sufficiently thick outer skin over the wooden core to resist impact from the bowling ball and/or other pins.

It has now been found that the specific gravity of the plastic material can be substantially lowered by incorporating into the polymerizable substance a particulate material having a substantially lower specific gravity than the resin substance, but which will not in any manner interfere with the impact resistance of the outer face of the coating around the wooden core of pin 10.

The specific particulate material which has been found to be the most advantageous, is a mass of discrete, hollow spherical particles, each provided with individually separate, continuous, hole-free, self-supporting walls which resist entry of the liquid resin into the interior thereof. The particles described above are approximately from 1 to 500 microns in diameter and are constructed of a film-forming substance which has a viscosity in a liquid state sufficiently low to permit subdivision of the solution into small droplets during production of the particles. For a more complete understanding of the nature of the particles or "Microballoons," the trademark under which this product is sold, reference is hereby made to U.S. Patent No. 2,797,201, issued to Standard Oil Company, Cleveland, Ohio, assignors of F. Veatch and R. W. Burhans on June 25, 1957.

It can now be appreciated that the specific gravity of the admixture introduced into mold 18 through opening 38 may be controlled by the quantity of Microballoons which are incorporated into the liquid resin and polysulfide material. The preferred composition which has been found to give a pin of suitable physical characteristics and which meets the weight requirements of the American Bowling Congress, is set forth in the following example:

| | Grams |
|---|---|
| Epon 820 | 300 |
| Thiokol LP-8 | 175 |
| Microballoons | 21 |
| Tetraethylene pentamine | 19 |
| Titanium dioxide | 10 |

The titanium dioxide is added merely to increase the whiteness of the coating composition and, manifestly, other coloring pigments may be utilized for different colors.

In the drawing the admixture, preferably one formed in accordance with the example above set forth, is designated by the numeral 48 and the initially liquid resin and polysulfide formulation which polymerizes to a solid state, is designated 50, while the Microballoons are numerated 52.

After admixture 48 has been introduced into mold 18 in surrounding relationship to wooden core 12, the prime mover (not shown) operably coupled with shaft 44, is actuated to rotate centrifuge table 40. Although the rate of rotation of mold 18 and the length of time of such rotation may vary somewhat with the materials utilized, it has been found that with a composition as set forth in the example above, that mold 18 should be centrifuged at approximately 350 r.p.m. for approximately ten minutes. The polymerizable formulation 50 will not harden or set up within this ten minute period and, therefore, the desired segregation of formulation 50 and Microballoons 52 will be effected during the period in which mold 18 is rotated. As has heretofore been noted and as clearly apparent in the drawing, rotation of mold 18 and also admixture 48 therewithin, causes formulation 50 and Microballoons 52 to at least partially segregate with the greatest proportion of formulation 50 being located adjacent the outer face of admixture 48 formed by cavities 22, while Microballoons 52 tend to congregate adjacent the outer surface of wooden core 12. This segregation and congregation is clearly illustrated in Figs. 5, 6 and 7 wherein it can be seen that there are merging strata of Microballoons 52 and liquid formulation 50.

Because of this segregation of formulation 50 and Microballoons 52, and consequent accumulation of the greatest proportion of liquid resin material adjacent the normal outer face of admixture 48, upon polymerization and hardening of the polymerizable resin and polysulfide rubber, the outermost surface of pin 10 presents a wear-resistant surface. Upon cessation of rotation of mold 18, pin 10 is allowed to remain in mold 18 until admixture 48 is sufficiently cured. Thereupon, mold halves 16 and 20 are removed from pin 10 thereby leaving the latter with a plastic coating 54 substantially completely encasing wooden core 12.

It is to be particularly noted that during rotation of mold 18, the part of coating 54 at main body 28 of pin 10 rotates at a considerably higher velocity in feet per second than does either the part of coating 54 adjacent head 24 or the part at neck 26. In fact, it can be seen that the part of coating 54 adjacent main body 28 rotates at the highest speed while the part of coating 54 adjacent head 24 and neck 26 respectively, rotate at decreasing proportional velocities.

The effect of this variable velocity is to cause variable segregation of formulation 50 and Microballoons 52. The greatest amount of segregation will occur at main body 28 while the next highest segregation will be found at head 24 and the least amount of segregation at neck 26 and end 30. Thus, by turning down the main body portion of wooden core 12 as at 32, coating 54 may be substantially thicker at main body 28 of pin 10 to provide a greater impact-resistant coating at this point than at other portions of coating 54. Because of the incorporation of Microballoons 52 into admixture 48, the provision of a thicker coating at main body 28 does not increase the over-all weight of pin 10 to the point where the same would not fall within the specifications of the American Bowling Congress.

Furthermore, it can be ascertained that because of the greater degree of segregation at main body 28, and to a lesser degree at head 24, the outer surface of pin 10 at main body 28 and head 24, contains a greater proportion of formulation 50 than do other parts of coating 54 and, therefore, present an outer surface of greater impact resistance than is the case at areas of pin 10 such as neck 26. This means that the parts of pin 10 which receive the greatest usage and which must withstand the greatest impacts, have an outer surface of greatest strength and wear resistance while without in any manner increasing the over-all weight of pin 10 beyond specified weight limits. It is not desirable to rotate mold 18 containing pin 10 at a sufficient rate and for a sufficient period of time to completely segregate formulation 50 and Microballoons 52 and the period of rotation and the rate will be governed by the degree of segregation desired.

It is preferred that the mold 18 be rotated at a sufficient rate to produce a coating 54 on pin 10 which gives a hardness of 55 on the Shore D scale at main body 28. In this manner, the heaviest impact point of the pin is maintained at the belly or main body portion of pin 10 exactly where the same should be.

The present invention, therefore, provides a method of producing bowling pins of controlled weight which not only meet the size specifications defined by the American Bowling Congress, but also are constructed so as to be of optimum weight. As previously pointed out, the principal problem confronting manufacturers of bowling pins is the production of a pin which is of a specified size and weight, yet is of sufficient durability to withstand extreme punishment over an extended period of time.

Pins constructed of wood meet such standards of course, since the specifications were initially predicated on wooden pins, but because most plastic substances have a higher specific gravity than wood, addition of a plastic coating to the pins usually makes the pins too heavy to meet the limits set down by the American Bowling Congress. It has been the usual practice to turn down the wooden cores of the pins which are to be plastic coated so that upon application of the polymerizable material, the pins still retain the specified dimensions after coating, but manifestly, the weight of the wooden portion of the pin which is removed is not proportionally equal to the weight of the plastic coating added and the over-all weight of the pin is increased to a point where the same is usually above the prescribed weight limit.

The present process completely obviates this problem inasmuch as the weight of the plastic coating can be controlled so as to be equal to or weigh even less than the wood which has been removed from the wooden core, this result being accomplished by adding a sufficient quantity of Microballoons to the plastic substance prior to molding thereof to lower the specific gravity of the same to a desired level. In this manner, the mass of the entire pin may be very accurately controlled to produce a pin of optimum weight, while molding of the pin a suitable mold assures that the same is in strict conformity with the size specifications. It can be appreciated that the exact amount of Microballoons to be added to the plastic material will vary with the thickness of the plastic coating as well as the density of the wooden core and that the exact quantities can be easily and quickly determined by those skilled in this art.

Although a molding operation has been described as the preferred method of constructing pin 10, other processes may be employed if desired. Most usually, compression and extrusion molding processes are not satisfactory because stresses are set up in the plastic material which lowers the useful life of the pin and makes the same unsatisfactory for many operations. However, it is contemplated that the present invention may be additionally utilized to produce other articles than bowling pins 10 and in the production of these other articles, compression and extrusion molding operations would be operable since stresses set up in the material might not operate in a detrimental manner.

Another example of products which may be constructed in accordance with the process of the present invention is radar domes adapted for disposition on the fuselage of airplanes for housing electronic radar equipment and the like. In domes of this type, it is a problem to keep the weight thereof at a minimum while providing a dome having a wear-resistant outer surface. By utilization of the present process, Microballoons may be incorporated into the polymerizable substance to lower the specific gravity thereof while rotation of the dome would properly segregate the Microballoons from the polymerizable formulation to present a wear-resistant outer surface upon hardening of the composition.

Although the present method has been described by placing each individual mold 18 upon a centrifuge table 40 and subsequently rotating the same, it can be readily appreciated that the method is particularly advantageous from a manufacturing standpoint because a plurality of molds 18 may be disposed in an upright position upon an elongated conveyor and moved along an assembly line.

Rotation of molds 18 may be easily effected by providing a spur gear on the lowermost end of the mold 18 and positioning the same so it is engageable with an elongated toothed track so that as the molds 18 are moved along the conveyor, the spur gear in operable engagement with the toothed track, causes the molds 18 to rotate at a rate dependent upon the speed of the conveyor and for a time proportional to the length of the toothed track. Under optimum conditions, the polymerizable resin will preferably set up substantially immediately after the mold 18 has ceased to rotate, but if it is desired to heat-cure pin 10, molds 18 containing the pin may be removed from the conveyor and placed in a suitable heat-curing oven or the like.

Although the present invention has been particularly described with respect to the utilization of epoxy resins, it is to be pointed out that other polymerizable substances may be utilized, especially those which will polymerize under the influence of a catalyst or heat and which will exhibit the desired impact elongation and hardness characteristics necessary. Among other resins which might be employed, are the vinyl plastisols, phenol-formaldehydes, the acrylates and methacrylates which are initially in a liquid monomer state, and similar substances.

Another important feature of the present invention is the fact that pins 10 may be constructed of plastic material without the utilization of a wooden core 12 or the like, and the required specific gravity of the finished product may be maintained within the specifications of the American Bowling Congress by utilizing a sufficient quantity of Microballoons 52. However, because of the fact that all plastic pins have not as yet reached the same degree of acceptance as plastic coated wooden cored pins, the present method still presents a method of producing a plastic coated pin having a longer useful life than any of those heretofore known. For example, it has been found that pins 10 containing a coating such as 54, have a useful life of over twice those which are coated with a thin layer of vinyl plastic or the like.

Having thus described the invention what is claimed as new and desired to be secured by Letters Patent is:

1. A bowling pin comprising a body defining said pin including a dispersion of particulate material in a quantity of solid polymerized substance having a higher specific gravity than the material, said substance and the material being partially segregated with the greatest accumulation of substance located adjacent the outer portion of the body to present a wear-resistant outer surface.

2. A bowling pin comprising a body defining said pin including a dispersion of a mass of discrete, hollow, spherical particles in a quantity of solid polymerized substance having a higher specific gravity than the particles, said substance and the particles being partially segregated with the greatest accumulation of substance located adjacent the outer portion of the body to present a wear-resistant outer surface.

3. A bowling pin comprising an elongated, longitudinally irregularly-shaped body defining said pin including a dispersion of a mass of discrete, hollow, spherical particles in a quantity of solid, polymerized epoxy type resin substance having a higher specific gravity than the particles, said substance and the particles being partially, longitudinally non-uniformly segregated with the greatest accumulation of substance located adjacent those areas of the body transversely spaced the greatest distance from the longitudinal axis of the body.

4. A bowling pin as set forth in claim 3 wherein said body includes a core surrounded by said substance containing the dispersed particles.

5. A method of producing a bowling pin having an irregular longitudinal cross-sectional configuration, said method including the steps of admixing a fluid synthetic resin substance capable of undergoing polymerization to a solid state and a particulate material having a lower specific gravity than said substance; supporting said admixture in pin defining configuration and for rotation about the longitudinal axis thereof; and rotating said admixture to effect proportional segregation of the substance and the material depending upon the relative velocity of various parts of the admixture, said rotation being continued for a period of time and at a rate to cause a sufficiently greater degree of segregation of the substance and the material in those areas of the admixture in greatest spaced relationship from the axis of rotation to thereby present a harder and more wear-resistant outer surface at said areas upon polymerization of the substance and which areas are inherently subjected to the most strain and wear during utilization of the pin.

6. A method as set forth in claim 5 wherein said material constitutes a mass of discrete, hollow particles.

7. A method as set forth in claim 6 wherein said particles are provided with separate, continuous, substantially hole-free, self-supporting walls, said particles being from 1 to 500 microns in diameter.

8. A method as set forth in claim 5 wherein said substance is an epoxy type resin.

9. A method as set forth in claim 8 wherein said synthetic resin substance includes a self-curing agent for effecting polymerization of the substance while supported in said pin defining configuration.

10. A method as set forth in claim 9 wherein said curing agent is selected from the group consisting of amines, polyamines, organic acids, anhydrides and polyanhydrides.

11. A method as set forth in claim 9 wherein said admixture includes a polymerizable fluid polysulfide rubber, said curing agent being capable of effecting copolymerization of the resin and said rubber.

12. A method as set forth in claim 11 wherein said polysulfide rubber is liquid polythiodithiol polymer prepared by reacting bis(2-chloroethyl)formal with trichloropropane.

13. A method as set forth in claim 9 wherein said admixture includes a polymerizable fluid plasticizer resin, said curing agent being capable of effecting copolymerization of the resin and said plasticizer resin.

14. A method of producing a bowling pin having an irregular longitudinal cross-sectional configuration, said method including the steps of admixing a fluid synthetic resin substance capable of undergoing polymerization to a solid state and a particulate material having a lower specific gravity than said substance; supporting said admixture in pin defining configuration in surrounding relationship to a core substantially complemental in configuration to said pin, and for rotation about the longitudinal axis thereof; and rotating said admixture and the core to effect proportional segregation of the substance and the material depending upon the relative velocity of various parts of the admixture, said rotation being continued for a period of time and at a rate to cause a sufficiently greater degree of segregation of the substance and the material in those areas of the admixture in greatest spaced relationship from the axis of rotation to thereby present a harder and more wear-resistant outer surface at said areas upon polymerziation of the substance and which areas are inherently subjected to the most strain and wear during utilization of the pin.

References Cited in the file of this patent

UNITED STATES PATENTS

| | | |
|---|---|---|
| 719,244 | Mooney | Jan. 27, 1903 |
| 1,175,428 | Freeman | Mar. 14, 1916 |
| 1,318,520 | Wolever | Oct. 14, 1919 |
| 1,520,749 | Brownrigg | Dec. 30, 1924 |
| 1,832,066 | Von Webern | Nov. 17, 1931 |
| 1,896,973 | Rutenberg | Feb. 7, 1933 |
| 1,984,863 | Clark et al. | Dec. 18, 1934 |
| 2,346,784 | Pollack | Apr. 18, 1944 |
| 2,363,306 | Fiske | Nov. 21, 1944 |
| 2,460,242 | Renaud | Jan. 25, 1949 |
| 2,729,618 | Muller et al. | Jan. 3, 1956 |
| 2,763,032 | Fay | Sept. 18, 1956 |

FOREIGN PATENTS

| | | |
|---|---|---|
| 126,535 | Australia | Nov. 21, 1945 |
| 780,458 | Great Britain | July 31, 1957 |